US007881828B2

(12) United States Patent
Schmidt

(10) Patent No.: US 7,881,828 B2
(45) Date of Patent: Feb. 1, 2011

(54) BUS MODULE FOR CONNECTING ELECTRICALLY TRIGGERED FLUIDIC VALVES

(75) Inventor: Stefan Schmidt, Lohr am Main (DE)

(73) Assignee: Bosch Rexroth AG, Stuttgart (DE)

( * ) Notice: Subject to any disclaimer, the term of this patent is extended or adjusted under 35 U.S.C. 154(b) by 644 days.

(21) Appl. No.: 11/630,091

(22) PCT Filed: Jun. 11, 2005

(86) PCT No.: PCT/EP2005/006288

§ 371 (c)(1), (2), (4) Date: Feb. 28, 2008

(87) PCT Pub. No.: WO2005/124161

PCT Pub. Date: Dec. 29, 2005

(65) Prior Publication Data

US 2009/0019200 A1 Jan. 15, 2009

(30) Foreign Application Priority Data

Jun. 18, 2004 (DE) ....................... 10 2004 029 549

(51) Int. Cl.

*G05D 7/00* (2006.01)
*G05D 11/00* (2006.01)
*G01F 1/00* (2006.01)
*G01F 7/00* (2006.01)
*G01F 25/00* (2006.01)
*G06F 3/00* (2006.01)
*G06F 13/00* (2006.01)

(52) U.S. Cl. ....................... 700/282; 700/275; 700/289; 702/45; 702/46; 702/47; 710/15; 710/72; 710/100; 73/1.22; 73/1.23

(58) Field of Classification Search ................. 700/275, 700/282, 289; 702/45–49; 73/1.22, 1.23; 710/15, 72, 100

See application file for complete search history.

(56) References Cited

U.S. PATENT DOCUMENTS 5,053,960 A * 10/1991 Brekkestran et al. .......... 701/51

(Continued)

FOREIGN PATENT DOCUMENTS

CH 683 021 12/1993

(Continued)

OTHER PUBLICATIONS

*Cube 67 D1O8 D18 E Rail*, Impulse News, (found on internet: www.murrelektronik.com), Feb. 2004.

(Continued)

*Primary Examiner*—Ramesh B Patel
(74) *Attorney, Agent, or Firm*—Kenyon & Kenyon LLP

(57) ABSTRACT

A bus module for connecting electrically triggerable fluidic valves to a data bus. The bus module has an electrical circuit configuration, which evaluates address data and user data from data telegrams transmitted on the data bus and which triggers a fluidic valve determined by the address data in accordance with the user data of the data telegram. In order to keep the current load on the bus module low particularly when triggering hydraulic valves, the electronic circuit configuration, following the reception of user data in the form of a switch-on command for one of the fluidic valves connected to the bus module, first constantly supplies a supply voltage to the fluidic valve determined by the address data during a gate-controlled rise time of specifiable duration. Following the expiration of the gate-controlled rise time, the electronic circuit configuration supplies the fluidic valve with the supply voltage in a pulse width modulated form having a specifiable pulse control factor. Only when the bus module has received user data in the form of a switch-off command for the previously switched-on fluidic valve, does the electronic circuit configuration no longer supply a supply voltage to the fluidic valve.

8 Claims, 2 Drawing Sheets

U.S. PATENT DOCUMENTS

| | | | | | |
|---|---|---|---|---|---|
| 5,325,287 | A * | 6/1994 | Spahr et al. | 700/17 |
| 5,341,488 | A * | 8/1994 | Kobayashi | 711/5 |
| 5,519,636 | A * | 5/1996 | Stoll et al. | 700/282 |
| 5,619,726 | A * | 4/1997 | Seconi et al. | 710/22 |
| 5,790,831 | A * | 8/1998 | Lin et al. | 710/315 |
| 5,809,258 | A * | 9/1998 | Bemanian et al. | 710/107 |
| 6,382,257 | B2 * | 5/2002 | Mead et al. | 137/884 |
| 2002/0000257 | A1 * | 1/2002 | Mead et al. | 137/884 |
| 2002/0020175 | A1 * | 2/2002 | Street et al. | 62/132 |
| 2005/0283553 | A1 * | 12/2005 | Droba | 710/200 |
| 2006/0241794 | A1 * | 10/2006 | Burkatovsky | 700/87 |

FOREIGN PATENT DOCUMENTS

| | | |
|---|---|---|
| CN | 1156430 | 8/1997 |
| DE | 34 15 649 | 11/1985 |

OTHER PUBLICATIONS

*Cube 67 Multiple Valve Cluster Connections*, Impulse News, (found on internet: www.murrelektronik.com), Feb. 2004.

* cited by examiner

BUS MODULE FOR CONNECTING ELECTRICALLY TRIGGERED FLUIDIC VALVES

FIELD OF THE INVENTION

The present invention relates to a bus module for connecting electrically triggered fluidic valves to a data bus having an electrical circuit configuration, which evaluates address data and user data from data telegrams transmitted on the data bus and which triggers the fluidic valve determined by the address data in accordance with the user data of the data telegram.

BACKGROUND INFORMATION

Such a bus module is manufactured and distributed e.g. by Murrelektronik GmbH under the name "MVK Metall". Details of this bus module are described in particular in the printed publication "Impulse NEWS" (date 03/11, edition 03/5,000) of the Murrelektronik GmbH. The bus module is used to connect up to eight stations in the form of actuators, such as e.g. electrically triggerable fluidic valves, or sensors to a data bus, in particular to a field bus. The bus modules have an electrical circuit configuration, which evaluates data telegrams transmitted on the data bus and which triggers an actuator determined by the address data in accordance with the user data of the data telegram. Such a data telegram is made up of address data, which identify a station, and user data, which transmit commands in the case of actuators or contain status data in the case of sensors. Such bus modules are widespread in pneumatics. The bus modules are designed according to the power requirement of pneumatic valves, which is lower than the power requirement of hydraulic valves. In order to take into account the higher power requirement of hydraulic valves compared to pneumatic valves, triggering hydraulic valves requires special designs, whose electrical components are designed for the higher current flow of these valves. This results in an increase of manufacturing costs and is also one reason that bus modules are not widely use for triggering hydraulic valves.

SUMMARY OF THE INVENTION

The present invention is based on the objective of creating by simple measures a bus module of the type mentioned at the outset, which is suitable both for triggering pneumatic valves as well as hydraulic valves on account of a reduced current load.

Since the pull-up current required for a control valve flows only briefly and since afterward only the holding current continues to flow, which is reduced with respect to the pull-up current on account of the pulse width modulation, the electrical components of the electrical circuit configuration, which would be underdimensioned for the pull-up current as continuous current, are not unduly heated.

Instead of a control valve, it is possible to connect to the bus module according to the present invention a proportional valve operated as a controlling valve having a valve piston whose deflection is controllable by the pulse control factor of a pulse width modulated voltage. The deflection of the valve piston determines the passage cross section of the proportional valve. In order for the current load on the components not to become too high, in such an approach the pulse control factor of the pulse width modulation must not exceed a maximum value predefined by the load capacity of the electrical components of the bus module. This means that the valve piston of the proportional valve may be deflected from its rest position only within a partial range. The brief application of the full supply voltage to the proportional valve before the pulse width modulation becomes effective makes it possible to accelerate the response of a proportional valve.

The duration of the gate-controlled rise time and the pulse control factor as well as the frequency or period duration of the pulse width modulation are stored as parameters in the electrical circuit configuration, then switch-on commands and switch-off commands transmitted on the data bus are sufficient for triggering actuators connected to the bus module. Thus no reprogramming is necessary in systems in which the control valves are controlled by a programmable controller, generally called "SPS", by switch-on commands and switch-off commands. If the duration of the gate-controlled rise time, the pulse control factor as well as the frequency or the period duration of the pulse width modulation of actuators connected to the bus module are to be of different magnitude from case to case, then it is advantageous to transmit the corresponding values together with the switch-on command to the bus module in a data telegram. The frequency or the period duration of the pulse width modulation is either stored in the bus module as a parameter or alternatively it is contained as a further parameter in the user data of the data telegram for a switch-on command.

DETAILED DESCRIPTION

Figure 1:
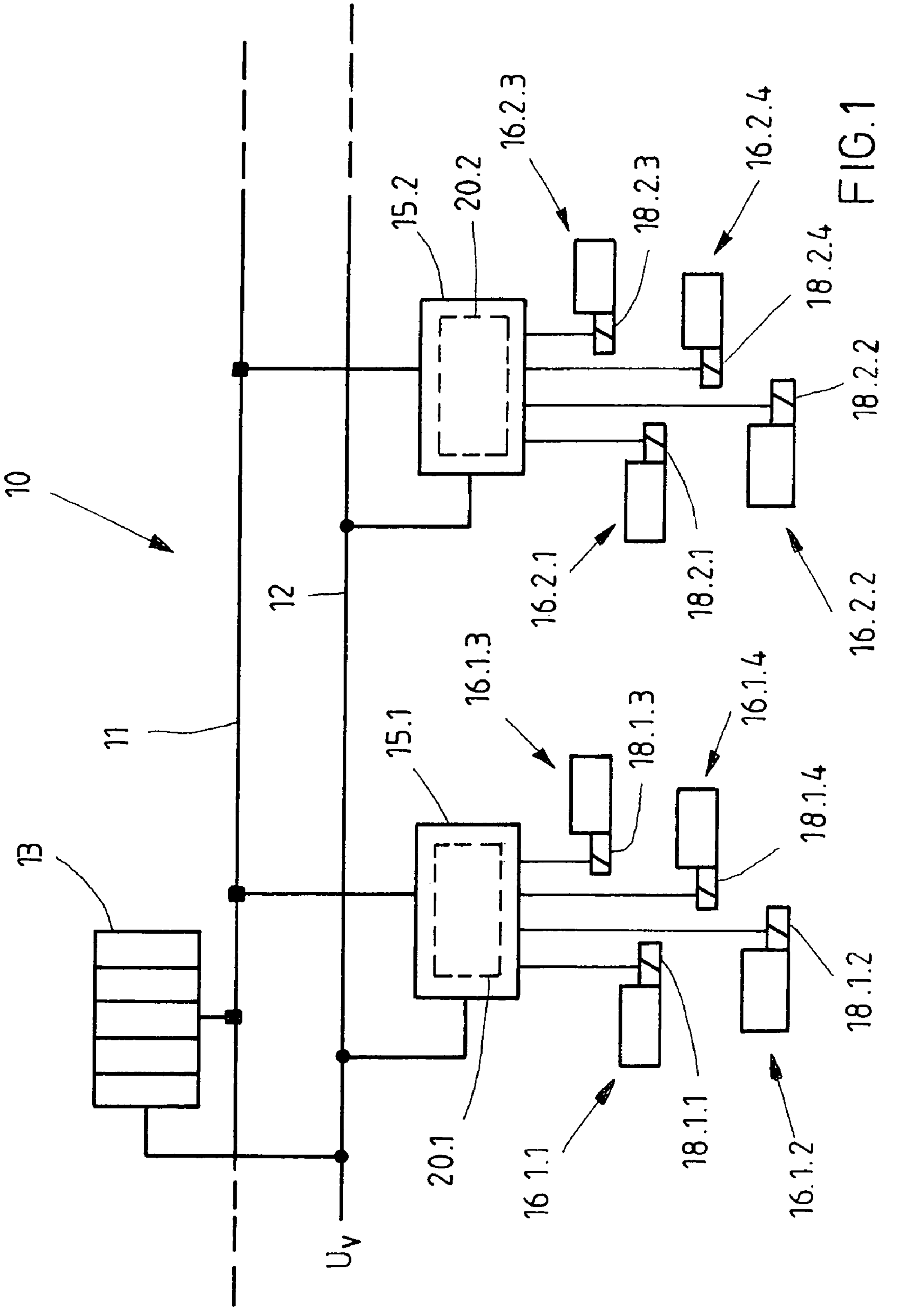
FIG. 1 shows a bus system having two bus modules connected to a data bus and to an energy line in a schematic representation.

FIG. 1 shows a bus system 10 having a data bus 11 designed as a field bus, an energy line 12, a programmable controller 13 (called SPS for short in the following), two bus modules 15.1 and 15.2 as well as eight actuators in the form of switching hydraulic valves 16.1.1 through 16.1.4 and 16.2.1 through 16.2.4 having solenoids 18.1.1 through 18.1.4 and 18.2.1 through 18.2.4, respectively. For reasons of clarity, in this exemplary embodiment in each case only four hydraulic valves are connected to bus modules 15.1 and 15.2. In practice, connection possibilities for e.g. 8 or 16 sensors or actuators are customary.

The SPS 13 as well as bus modules 15.1 and 15.2 are stations of bus system 10. In this exemplary embodiment, SPS 13 is also used as master, i.e. it determines which of the stations connected to data bus 11 is allowed to send a data telegram at which point in time. A data telegram is made up of address data and user data. The address data determine for which hydraulic valve the user data are intended. The user data contain e.g. a switch-on or switch-off command for a hydraulic valve.

A supply voltage $U_v$ is supplied to bus modules 15.1 and 15.2 via energy line 12. The supply voltage is normally a direct voltage having a nominal value of 12 V or 24 V. In the exemplary embodiment shown in FIG. 1, supply voltage $U_v$ is also supplied to SPS 13. If required, however, SPS 13 can also be supplied with a different voltage. In their outer regions, data bus 11 and energy line 12 are represented by a dashed line in order to indicate that in addition to bus modules 15.1 and 15.2 further bus modules 15.*x* may be connected to data bus 11 and to energy line 12, the letter "x" standing for the consecutive number of such a bus module. Solenoids 18.1.1 through 18.1.4 and 18.2.1 through 18.2.4 of hydraulic valves 16.1.1 through 16.1.4 and 16.2.1 through 16.2.4, respectively, are connected to bus module 15.1.

Bus module 15.1 has an electronic circuit 20.1, which evaluates the data telegrams transmitted on data bus 11. When receiving a data telegram that is intended for a hydraulic valve 16.1.1 through 16.1.4 connected to bus module 15.1, electronic circuit 20.1 triggers the corresponding hydraulic valve in accordance with the information contained in the user data of the data telegram.

Figure 2:
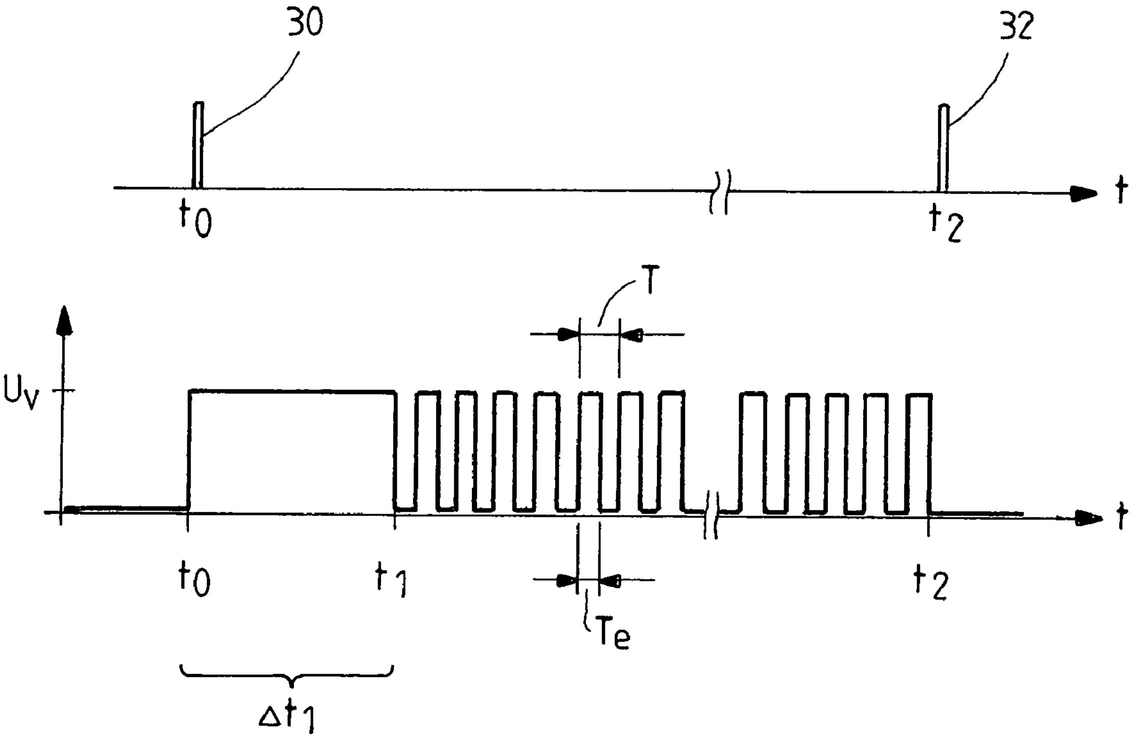
FIG. 2 shows the time characteristic of the voltage supplied to an actuator between a switch-on command and a switch-off command.

The following will consider the case in which bus module 15.1 has received a switch-on command for hydraulic valve 16.1.2. Following the reception of the switch-on command, indicated by reference numeral 30, at time to, as shown in FIG. 2 on the basis of a time diagram, electronic circuit configuration 20.1 according to the present invention constantly supplies supply voltage $U_v$ to solenoid 18.1.2 of hydraulic valve 16.1.2 first during a period of time called the gate-controlled rise time of specifiable duration $\Delta t_1$. In hydraulic valves designed as control valves, the duration of the gate-controlled rise time usually lies in the order of magnitude of up to one tenth of a second (0.1 sec). The full current, which is determined by the magnitude of supply voltage $U_v$ and the resistance of solenoid 18.1.2, flows during this period of time. Following the expiration of the gate-controlled rise time at time $t_1$, electronic circuit configuration 20.1 supplies supply voltage $U_v$ to solenoid 18.1.2 in pulse width modulated form. The pulse control factor designated in the following by $T_{\%}$, i.e. the quotient of the switch-on time designated by $T_e$ and the period duration designated by T, is represented here at 50%. In practice, the pulse control factor usually lies in a range between 30 and 55%. The frequency of the pulse width modulation designated by f lies in the order of magnitude of some hundred Hertz. This reliably prevents the hydraulic valve from switching in step with the pulse width modulated supply voltage. If bus module 15.1 at a later time, which is here designated by $t_2$, receives a switch-off command 32 for hydraulic valve 16.1.2, then bus module 15.1 interrupts the supply of the pulse width modulated supply voltage to solenoid 18.1.2. Hydraulic valve 16.1.2 is switched on in the period of time between times $t_0$ and $t_2$. However, the full current, which causes increased heating, flows only during gate-controlled rise time $\Delta t_1$. Afterwards, until time $t_2$, there only flows a current, usually called a holding current, which is reduced compared to the full current. In addition to the lower current load on the components of electronic circuit configuration 20.1 of bus module 15.1, this reduction of the current flowing across the solenoid also results in a reduction of the thermal load on solenoid 18.1.2 of hydraulic valve 16.1.2.

In the exemplary embodiment described above, the duration $\Delta t_1$ of the gate-controlled rise time as well as pulse control factor $T_{\%}$ and frequency f of the subsequent pulse width modulation are stored as parameters in electronic circuit configuration 20.1. For this purpose it is possible either to assign the same parameters to all hydraulic valves 16.1.1 through 16.1.4 connected to bus module 15.1 or to provide special parameters for each of the connected hydraulic valves and store them in electronic circuit configuration 15.1. Such a bus system has the advantage that, when using bus modules designed according to the present invention, as when using the known bus modules, SPS 13 only has to output switch-on and switch-off commands since parameters $\Delta t_1$, $T_{\%}$ und f are stored in the electronic circuit configuration.

By contrast, if a bus system is desired, in which duration $\Delta t_1$ of the gate-controlled rise time, pulse control factor $T_{\%}$ and/or frequency f of the pulse width formulation may be freely selected for each hydraulic valve at each switch-on command, then the SPS 13 is programmed in such a way that the user data of the data telegram for switching on an hydraulic valve in addition to the switch-on command contain the desired values for $\Delta t_1$, $T_{\%}$ and f as parameters. It is also possible to transmit only duration $\Delta t_1$ of the gate-controlled rise time and pulse control factor $T_{\%}$ of the pulse width modulation as parameters in the user data of a switch-on command and to store frequency f of the pulse width modulation in the electronic circuit configuration as a parameter.

Hydraulic valves 16.1.1 through 16.1.4 and 16.2.1 through 16.2.4 are controlling valves either in the form of pure control valves or of proportional valves operated as control valves. While pure control valves only have two switching positions (rest position or working position), the passage cross section of a proportional valve can assume an arbitrary number of values as a function of the pulse control factor of a pulse width modulated supply voltage. Within the scope of the present invention, the proportional valve is either supplied with no supply voltage (rest position) or it is supplied with the supply voltage in pulse width modulated form having a predetermined pulse control factor (working position). While in the case of a pure control valve the gate-controlled rise time is required so that the valve switches reliably, a gate-controlled rise time is generally not required in the case of a proportional valve, although it can be advantageous in the case of a proportional valve to accelerate the switch-on process in the manner of a lead.

What is claimed is:

1. A bus module for connecting electrically triggerable fluidic valves to a data bus, comprising:

an electrical circuit configuration, which evaluates address data and user data from data telegrams transmitted on the data bus and which triggers the fluidic valve determined by the address data in accordance with the user data of the data telegram, wherein:

following the reception of user data in the form of a switch-on command for one of the fluidic valves connected to the bus module, the electronic circuit configuration constantly supplies a supply voltage to the fluidic valve determined by the address data during a gate-controlled rise time of specifiable duration, following the expiration of the gate-controlled rise time, the electronic circuit configuration supplies to the fluidic valve the supply voltage in pulse-width modulated form having a specifiable pulse control factor, and following the reception of user data in the form of a switch-off command, the electronic circuit configuration no longer supplies a supply voltage to the fluidic valve for the previously switched-on fluidic valve.

2. The bus module as recited in claim 1, wherein the duration of the gate-controlled rise time and the pulse control factor as well as the frequency or the period duration of the subsequent pulse width modulation are stored as parameters in the electronic circuit configuration and following the reception of user data in the form of a switch-on command for a fluidic valve connected to the bus module, the electronic circuit configuration triggers the fluidic valve determined by the address data in accordance with the stored values.

3. A bus system, comprising:

a bus module for connecting electrically triggerable fluidic valves to a data bus, including:

an electrical circuit configuration, which evaluates address data and user data from data telegrams transmitted on the data bus and which triggers the fluidic valve determined by the address data in accordance with the user data of the data telegram, wherein:

following the reception of user data in the form of a switch-on command for one of the fluidic valves connected to the bus module, the electronic circuit configuration constantly supplies a supply voltage to the fluidic valve determined by the address data during a gate-controlled rise time of specifiable duration, following the expiration of the gate-controlled rise time, the electronic circuit configuration supplies to the fluidic valve the supply voltage in pulse-width modulated form having a specifiable pulse control factor, and following the reception of user data in the form of a switch-off command, the electronic circuit configuration no longer supplies a supply voltage to the fluidic valve for the previously switched-on fluidic valve;

wherein the user data of the data telegram contain, in addition to the switch-on command for a fluidic valve determined by the address data, the duration of the gate-controlled rise time and the pulse control factor of the subsequent pulse width modulation as parameters, and wherein in the event of a switch-on command, the electronic circuit configuration triggers the fluidic valve determined by the address data of the data telegram in accordance with the transmitted parameters.

4. The bus system as recited in claim 3, wherein:

the frequency or the period duration for the pulse width modulation is stored as a parameter in the electronic circuit configuration, and in the event of a switch-on command, the electronic circuit configuration triggers the fluidic valve determined by the address data of the data telegram in accordance with the transmitted parameters as well as the stored value.

5. The bus system as recited in claim 3, wherein:

the user data of the data telegram contain the frequency or the period duration for the pulse width modulation, and in the event of a switch-on command, the electronic circuit configuration triggers the fluidic valve determined by the address data of the data telegram in accordance with the transmitted parameters.

6. A bus system, comprising:

a bus module for connecting electrically triggerable fluidic valves to a data bus, including:

an electrical circuit configuration, which evaluates address data and user data from data telegrams transmitted on the data bus and which triggers the fluidic valve determined by the address data in accordance with the user data of the data telegram, wherein:

following the reception of user data in the form of a switch-on command for one of the fluidic valves connected to the bus module, the electronic circuit configuration constantly supplies a supply voltage to the fluidic valve determined by the address data during a gate-controlled rise time of specifiable duration, following the expiration of the gate-controlled rise time, the electronic circuit configuration supplies to the fluidic valve the supply voltage in pulse-width modulated form having a specifiable pulse control factor, and following the reception of user data in the form of a switch-off command, the electronic circuit configuration no longer supplies a supply voltage to the fluidic valve for the previously switched-on fluidic valve;

wherein the duration of the gate-controlled rise time and the pulse control factor as well as the frequency or the period duration of the subsequent pulse width modulation are stored as parameters in the electronic circuit configuration and following the reception of user data in the form of a switch-on command for a fluidic valve connected to the bus module, the electronic circuit configuration triggers the fluidic valve determined by the address data in accordance with the stored values, and wherein the user data of the data telegram contain, in addition to the switch-on command for a fluidic valve determined by the address data, the duration of the gate-controlled rise time and the pulse control factor of the subsequent pulse width modulation as parameters, and wherein in the event of a switch-on command, the electronic circuit configuration triggers the fluidic valve determined by the address data of the data telegram in accordance with the transmitted parameters.

7. The bus system as recited in claim 6, wherein the frequency or the period duration for the pulse width modulation is stored as a parameter in the electronic circuit configuration, and wherein in the event of a switch-on command, the electronic circuit configuration triggers the fluidic valve determined by the address data of the data telegram in accordance with the transmitted parameters as well as the stored value.

8. The bus system as recited in claim 6, wherein the user data of the data telegram contain the frequency or the period duration for the pulse width modulation, and wherein in the event of a switch-on command, the electronic circuit configuration triggers the fluidic valve determined by the address data of the data telegram in accordance with the transmitted parameters.

* * * * *